(12) United States Patent
Ding et al.

(10) Patent No.: US 11,802,233 B2
(45) Date of Patent: Oct. 31, 2023

(54) PERMEABILITY-ENHANCING FLOODING SYSTEM FOR TIGHT OIL RESERVOIRS, AND PREPARATION AND USE THEREOF

(71) Applicant: PetroChina Company Limited, Beijing (CN)

(72) Inventors: Bin Ding, Beijing (CN); Chunming Xiong, Beijing (CN); Xiangfei Geng, Beijing (CN); Baoshan Guan, Beijing (CN); Falin Wei, Beijing (CN); Jingjun Pan, Beijing (CN); Baocheng Wu, Beijing (CN); Jingfeng Dong, Beijing (CN); Youguo Yan, Beijing (CN)

(73) Assignee: PetroChina Company Limited, Beijing (CN)

( * ) Notice: Subject to any disclaimer, the term of this patent is extended or adjusted under 35 U.S.C. 154(b) by 129 days.

(21) Appl. No.: 17/433,839

(22) PCT Filed: Oct. 29, 2020

(86) PCT No.: PCT/CN2020/124636
§ 371 (c)(1),
(2) Date: Aug. 25, 2021

(87) PCT Pub. No.: WO2021/098467
PCT Pub. Date: May 27, 2021

(65) Prior Publication Data
US 2022/0145164 A1    May 12, 2022

(30) Foreign Application Priority Data

Nov. 20, 2019   (CN) .......................... 201911139683.8

(51) Int. Cl.
*C09K 8/584* (2006.01)
*E21B 43/16* (2006.01)

(52) U.S. Cl.
CPC .............. *C09K 8/584* (2013.01); *E21B 43/16* (2013.01); *C09K 2208/10* (2013.01)

(58) Field of Classification Search
CPC ...... C09K 8/584; C09K 2208/10; E21B 43/16
See application file for complete search history.

(56) References Cited

U.S. PATENT DOCUMENTS 3,945,437 A * 3/1976 Chiu ...................... E21B 43/20
                                                                    166/305.1
5,811,384 A * 9/1998 Tracy ...................... C11D 1/74
                                                                    510/423

(Continued)

FOREIGN PATENT DOCUMENTS

| CN | 101104794 A | 1/2008 |
| CN | 101210174 A | 7/2008 |

(Continued)

OTHER PUBLICATIONS

Wenke, Z., "Progress of Research On Surfactant Oil Displacement Systems", Guangdong chemical Industry, vol. 40 No. 4, 4 pgs., (2013).

(Continued)

*Primary Examiner* — Aiqun Li
(74) *Attorney, Agent, or Firm* — Hamilton, Brook, Smith & Reynolds, P.C.

(57) ABSTRACT

A permeability-enhancing flooding system for tight oil reservoirs and preparation and use thereof are disclosed. The permeability-enhancing flooding system is present in a state of oil-in-water droplet and composed of a surfactant, an oil-soluble substance and water, and has an outer phase that is an aqueous solution containing the surfactant, and an inner phase that is the oil-soluble substance; and the surfactant comprises one of nonionic gemini surfactants and anionic gemini surfactants, or a combination of two or more thereof. The preparation process for the permeability-enhancing (Continued)

flooding system is simple to operate, suitable for industrialized production, and low in overall cost, and has obvious application prospects in the field of tight oil reservoirs for an enhanced oil recovery.

9 Claims, 10 Drawing Sheets

(56) References Cited

U.S. PATENT DOCUMENTS

| | | | |
|---|---|---|---|
| 5,846,926 | A | 12/1998 | Tracy et al. |
| 2007/0142235 | A1 | 6/2007 | Berger et al. |
| 2012/0234548 | A1* | 9/2012 | Dyer ..................... E21B 37/06 |
| | | | 507/260 |
| 2019/0177491 | A1 | 6/2019 | Zhou et al. |
| 2020/0206706 | A1 | 7/2020 | Ding et al. |
| 2020/0208040 | A1 | 7/2020 | Ding et al. |
| 2020/0208044 | A1 | 7/2020 | Geng et al. |
| 2020/0208045 | A1 | 7/2020 | Geng et al. |

FOREIGN PATENT DOCUMENTS

| | | |
|---|---|---|
| CN | 101270279 A | 9/2008 |
| CN | 101824313 A | 9/2010 |
| CN | 104099078 A | 10/2014 |
| CN | 104830301 A | 8/2015 |
| CN | 105586025 A | 5/2016 |
| CN | 108114617 A | 6/2018 |
| CN | 109678720 | 1/2019 |
| CN | 109722233 A | 5/2019 |
| CN | 109851530 A | 6/2019 |
| CN | 109852364 A | 6/2019 |
| RU | 2153576 C1 | 7/2000 |
| RU | 2196224 C2 | 1/2003 |
| WO | WO 2017/174770 A1 | 10/2017 |
| WO | WO 2019022763 A1 | 1/2019 |

OTHER PUBLICATIONS

Ding, B., et al., "Characteristics and EOR mechanisms of nanofluids permeation flooding for tight oil", Petroleum Exploration and Development, vol. 47 No. 4, 10 pgs. (Aug. 2020).

Ge-Xiu, Tao, "Physical Chemistry", University of Science and Technology of China Press, 4 pages, (Aug. 31, 2014).

International Search Report of International Application No. PCT/CN2020/124636 "Permeability-Enhancing Oil Displacement System of Tight Oil Reservoir, Preparation thereof and Application Thereof", dated Jan. 4, 2021.

Written Opinion of International Application No. PCT/CN2020/124636 "Permeability-Enhancing Oil Displacement System of Tight Oil Reservoir, Preparation thereof and Application Thereof", dated Jan. 4, 2021.

* cited by examiner

[Fig. 1]
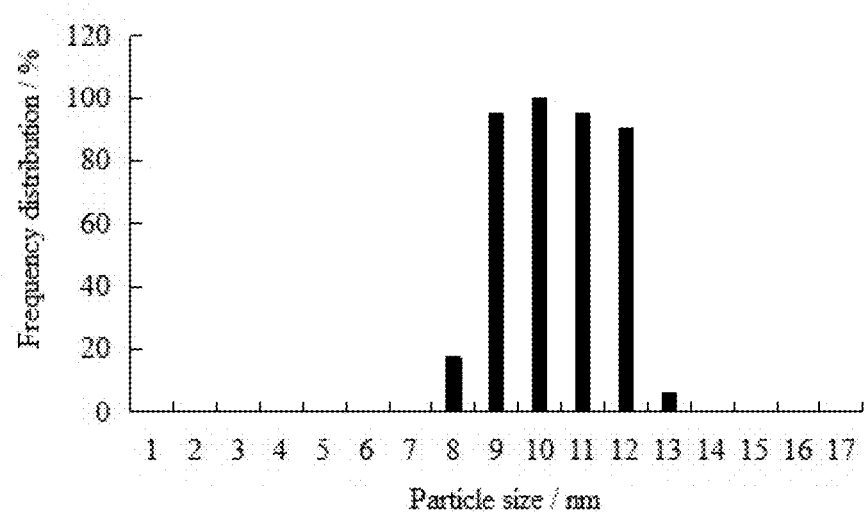
[Fig. 2]
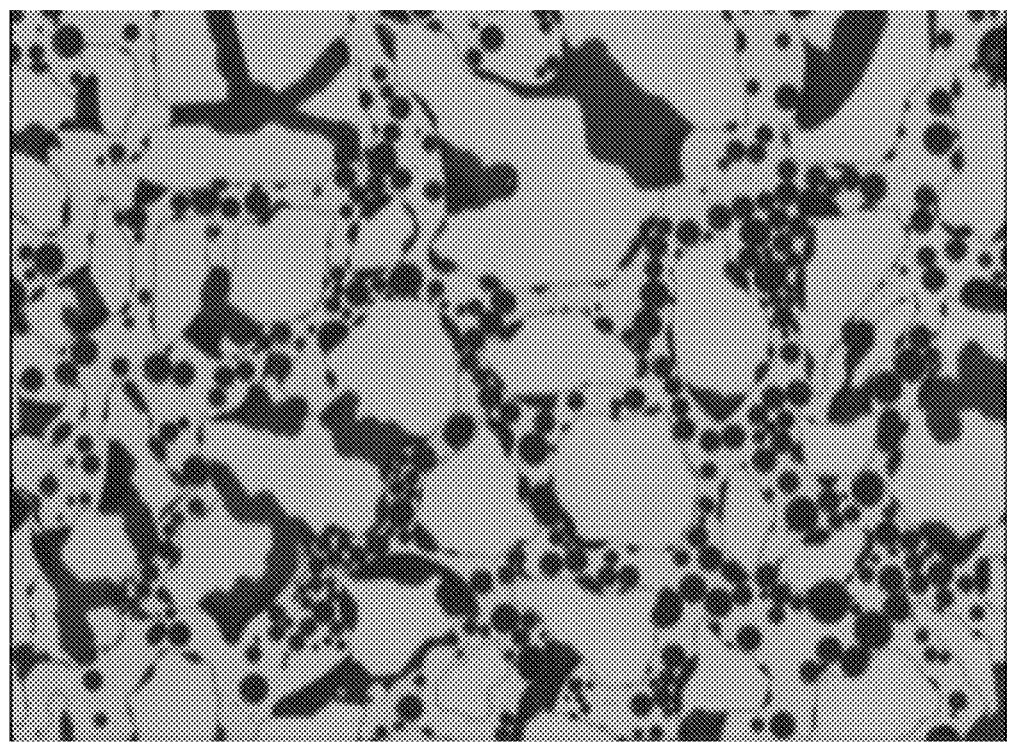

[Fig. 3]
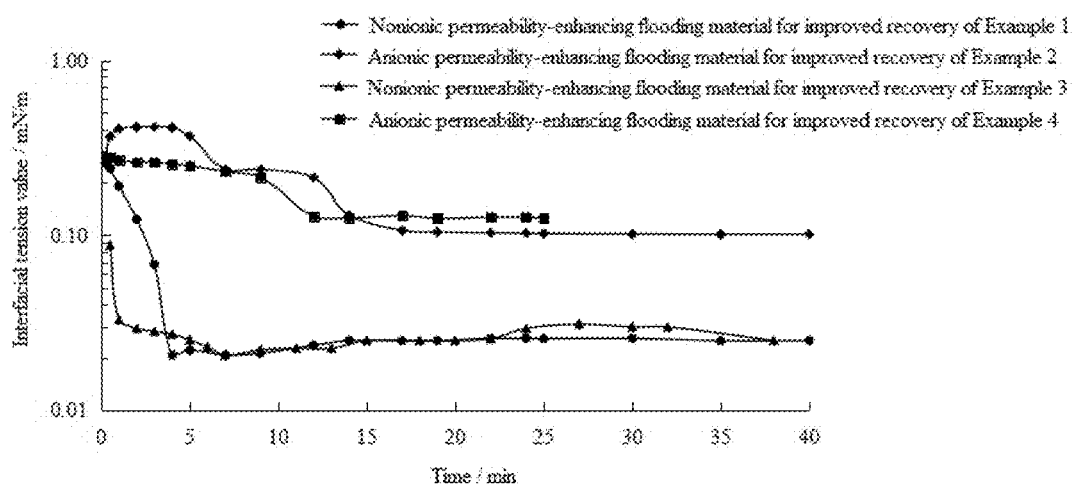
[Fig. 4]
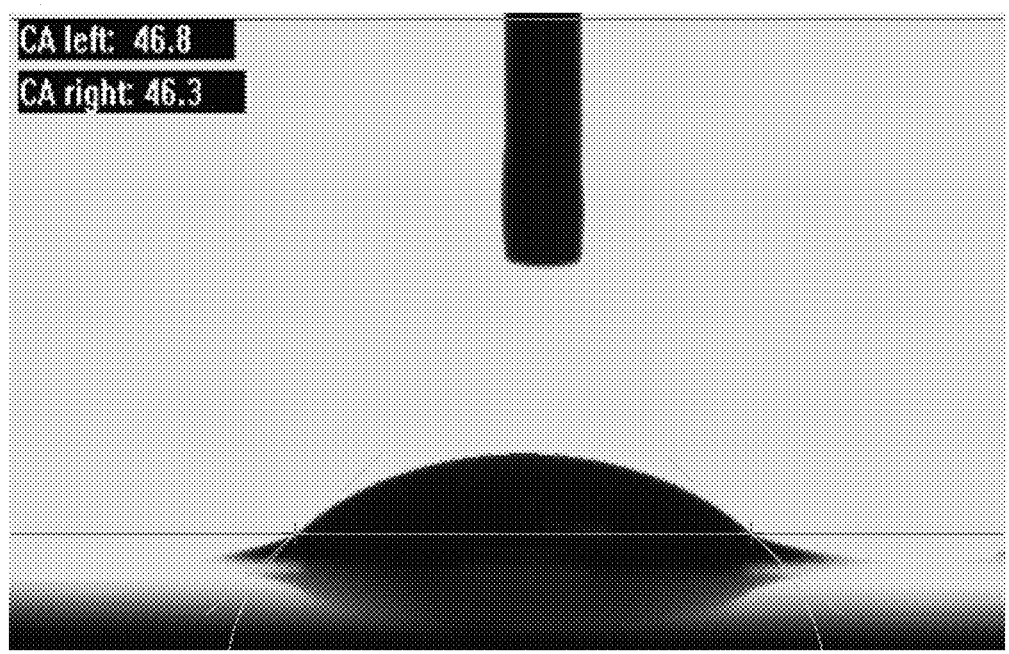

[Fig. 5]
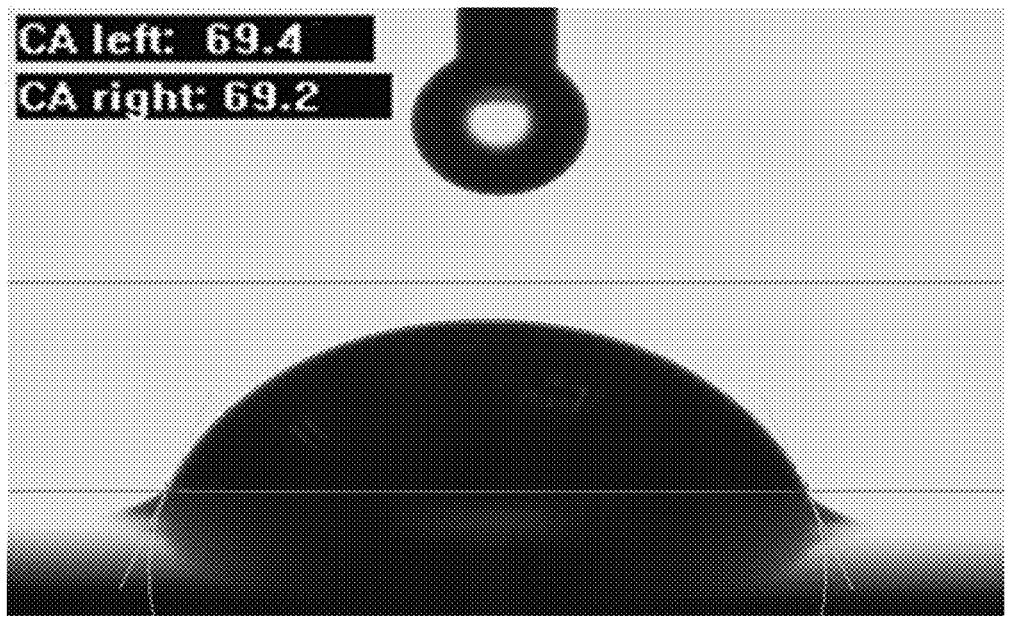
[Fig. 6]
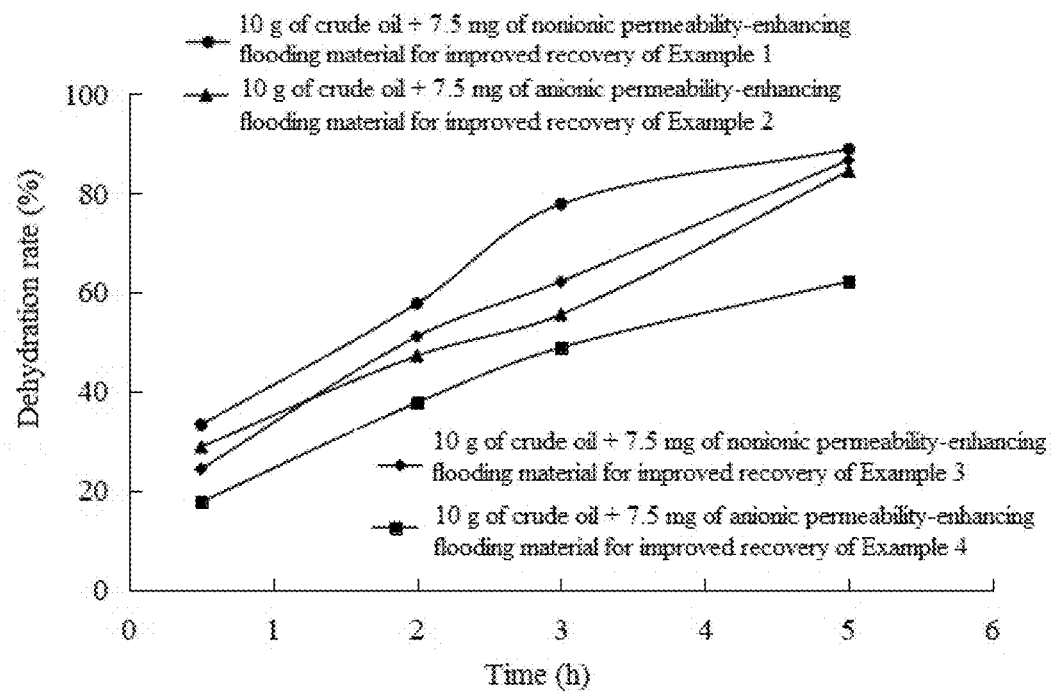

[Fig. 7]
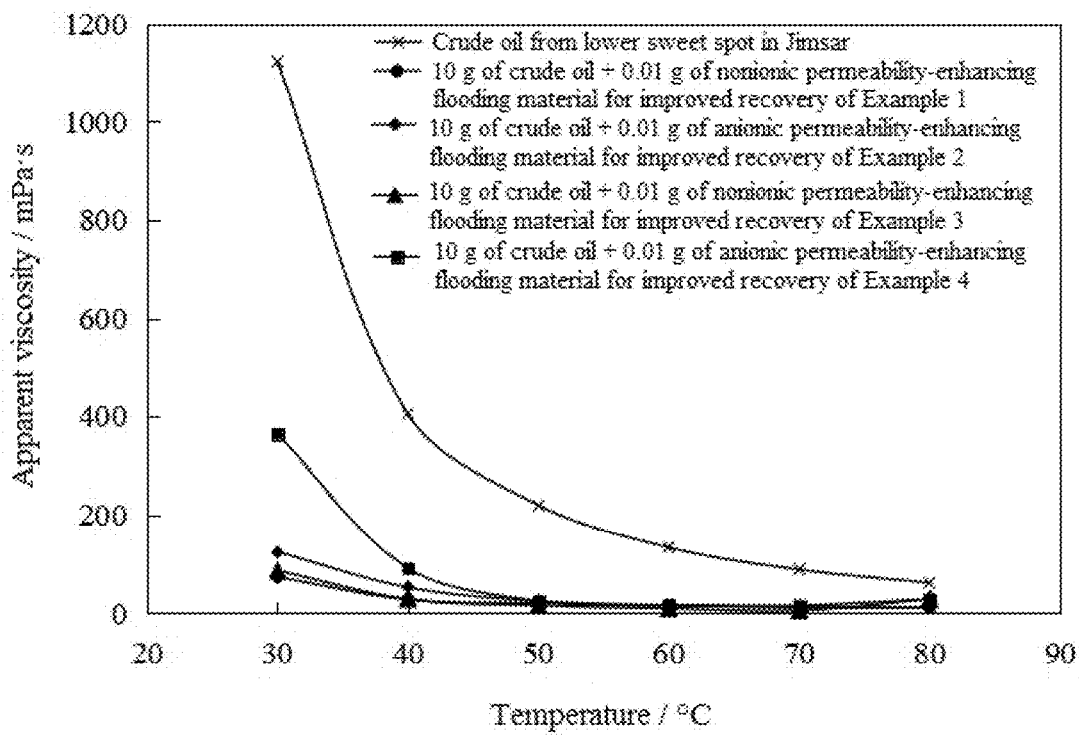
[Fig. 8]
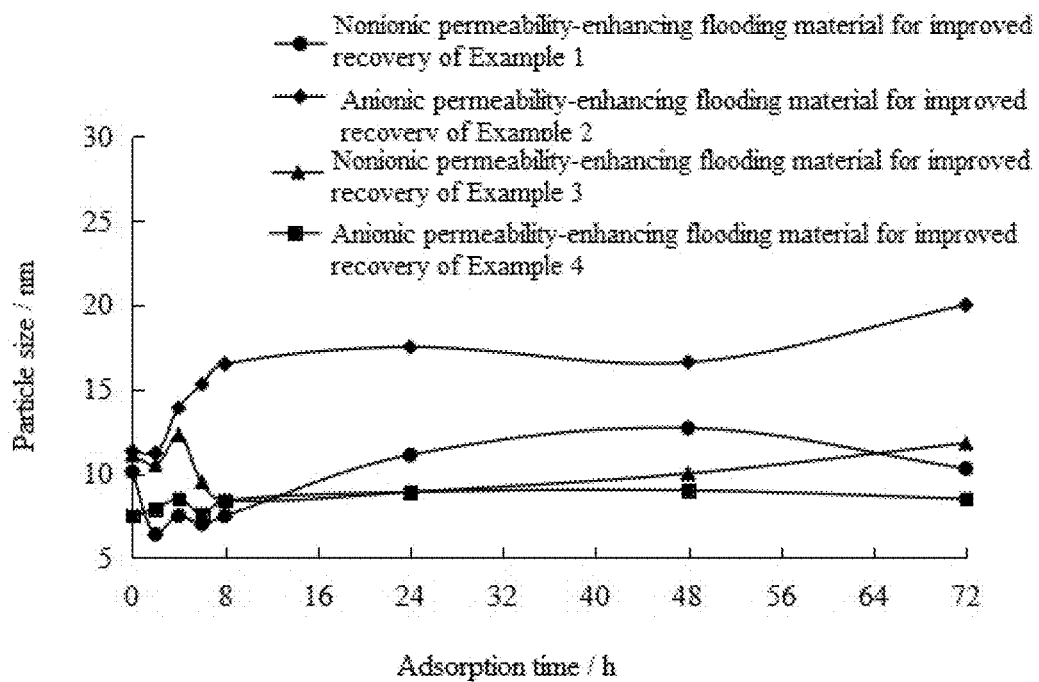

[Fig. 9]
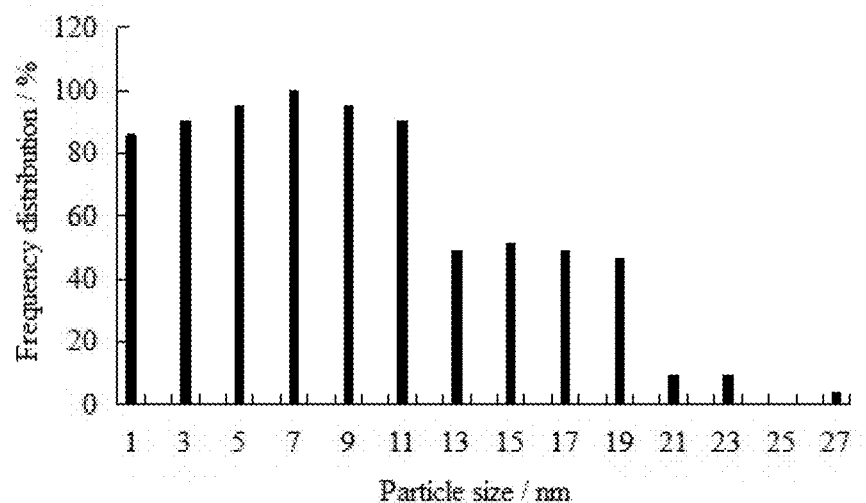
[Fig. 10]
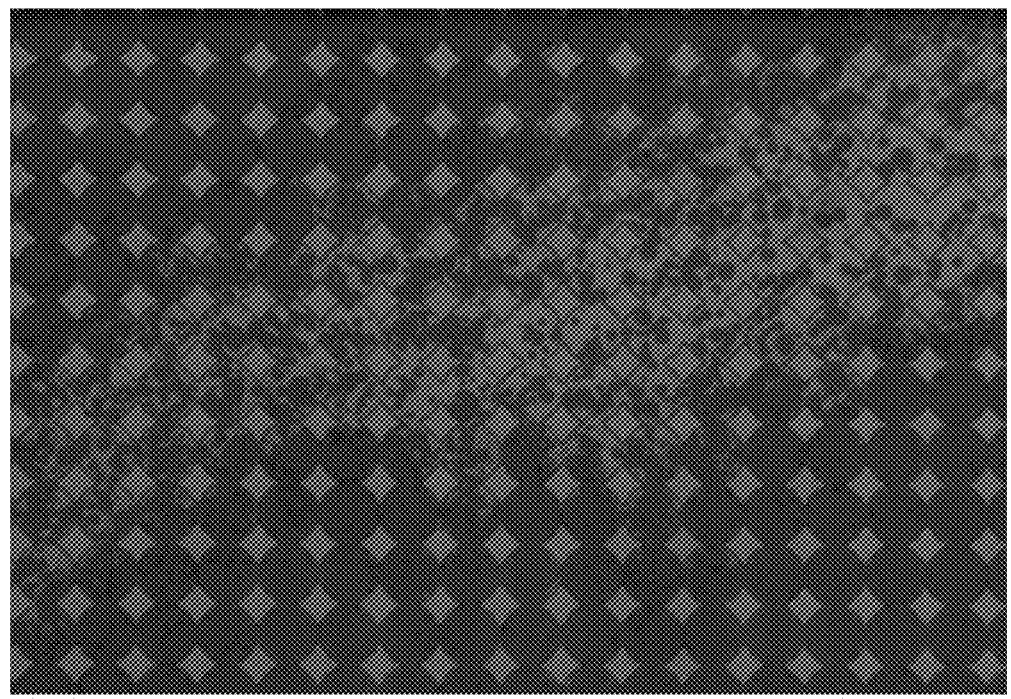

[Fig. 11]
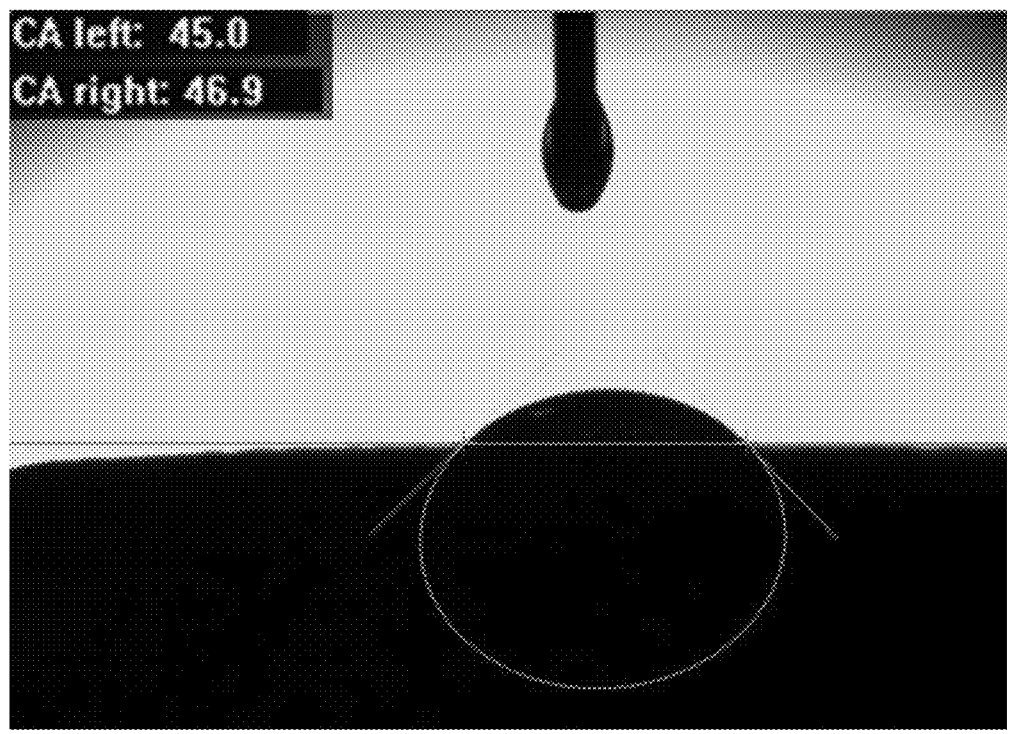
[Fig. 12]
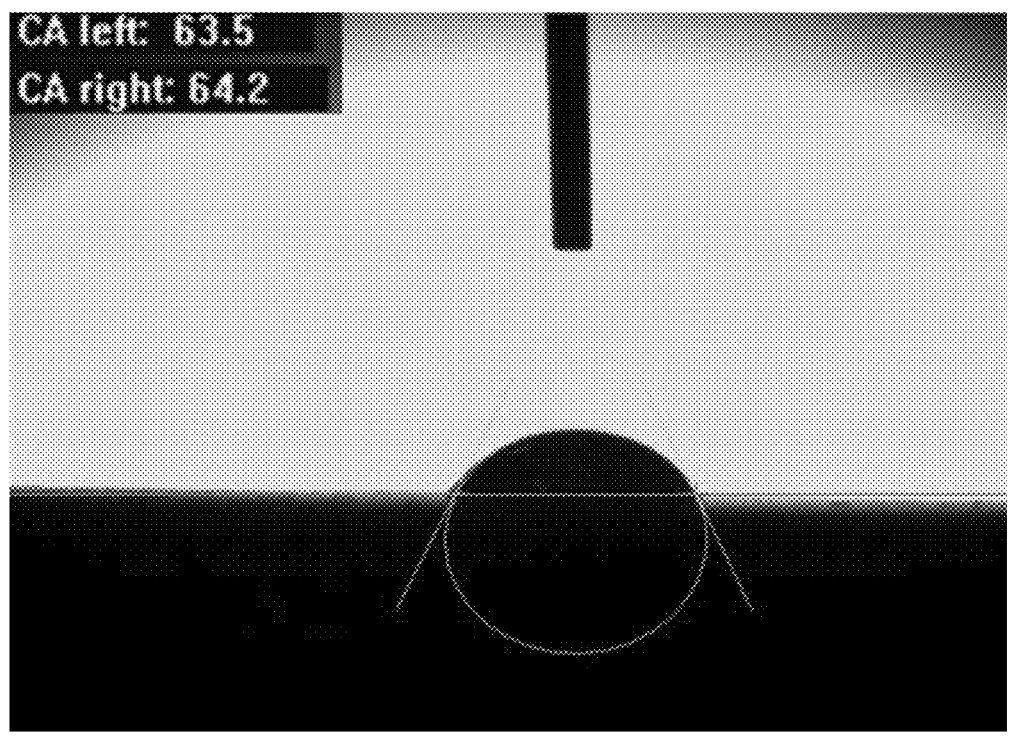

[Fig. 13]
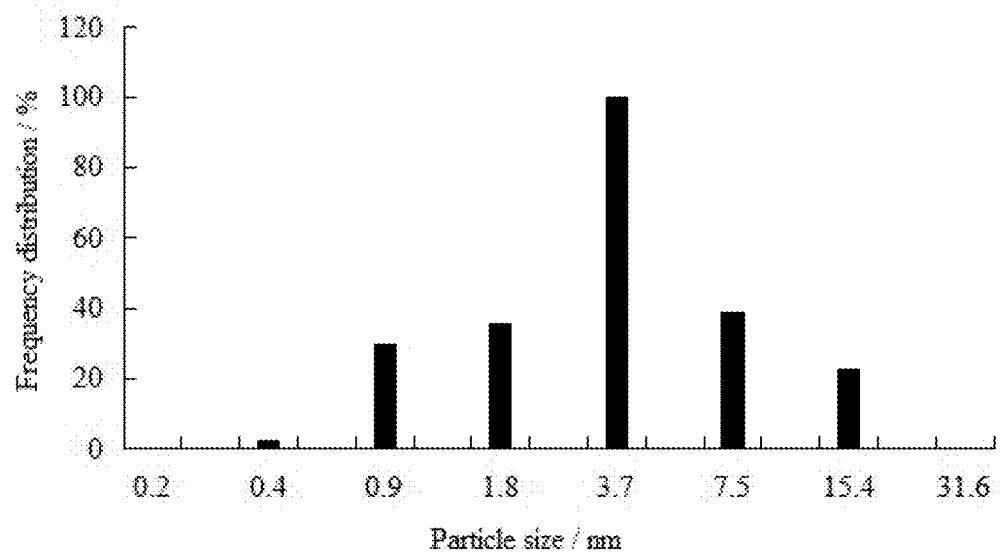
[Fig. 14]
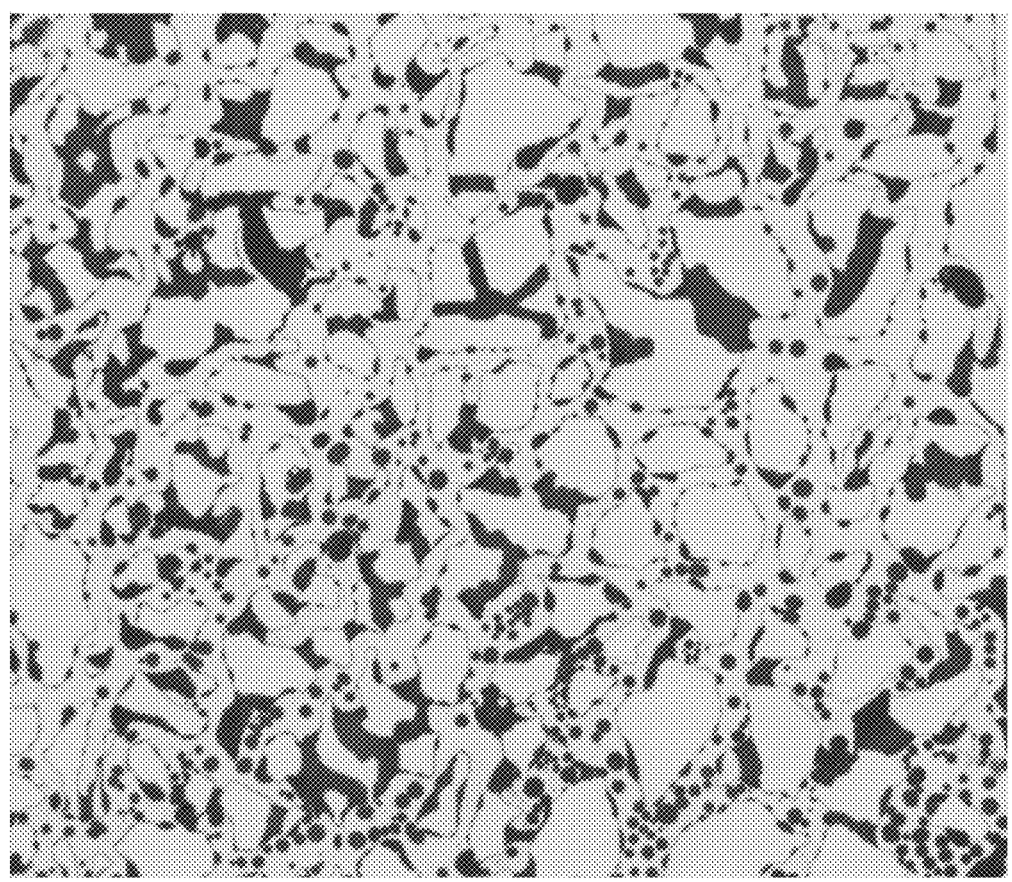

[Fig. 15]
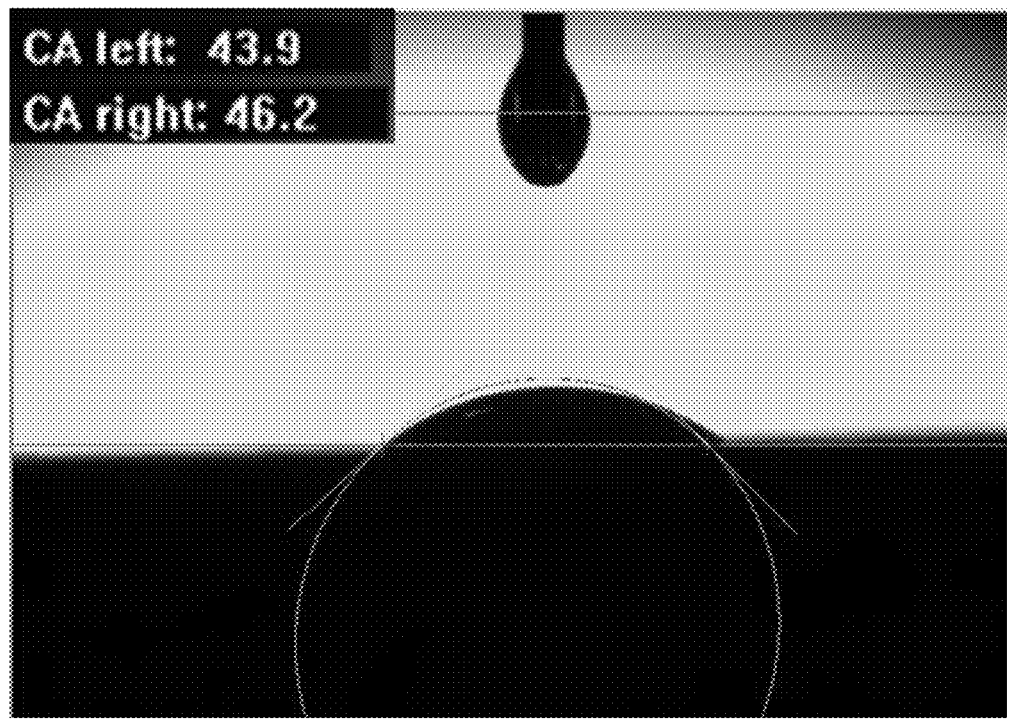
[Fig. 16]
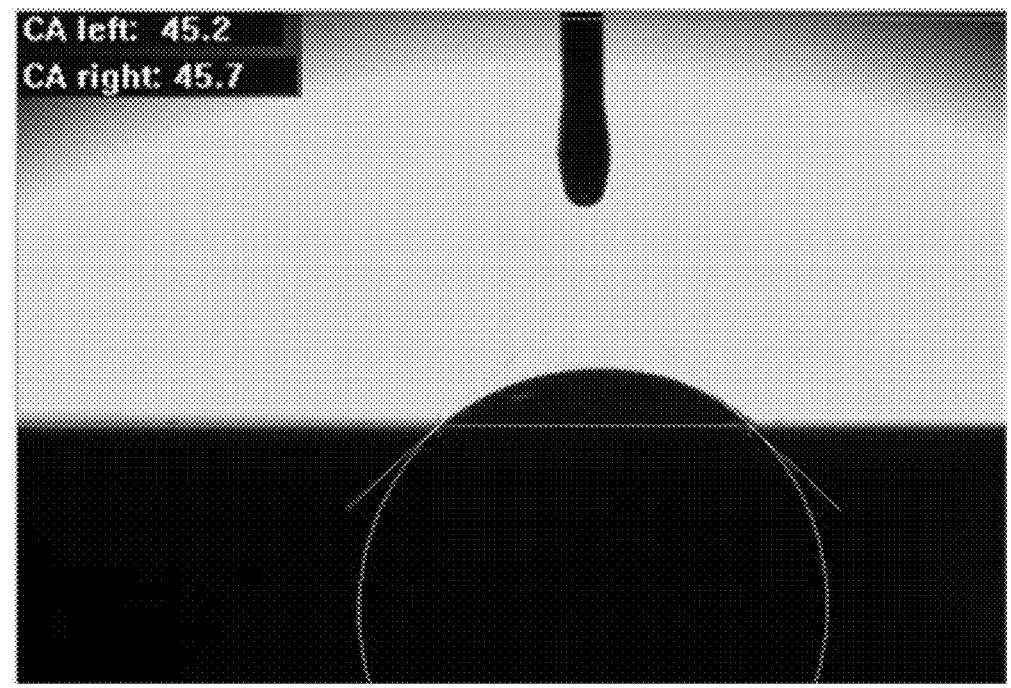

[Fig. 17]
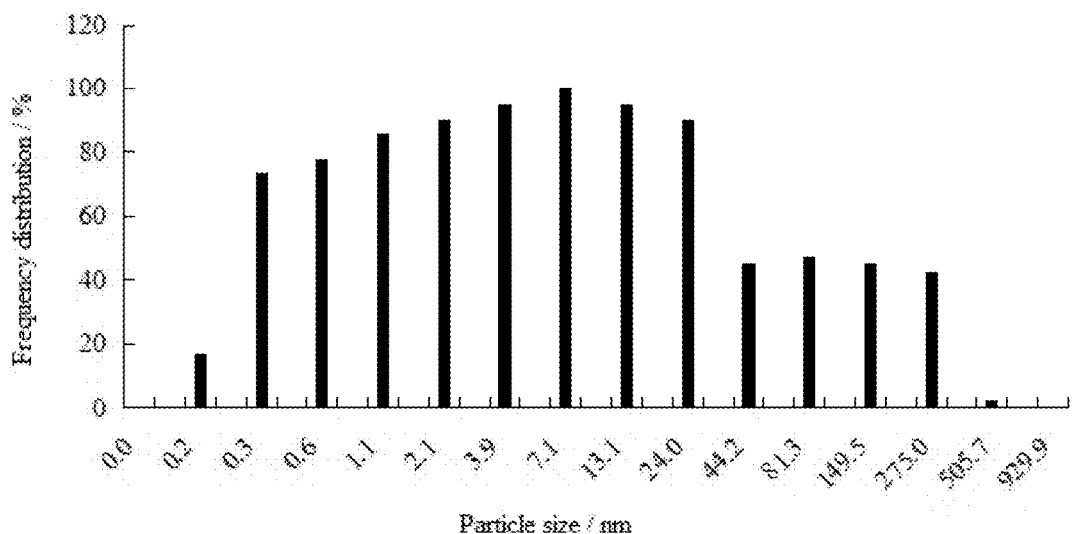
[Fig. 18]
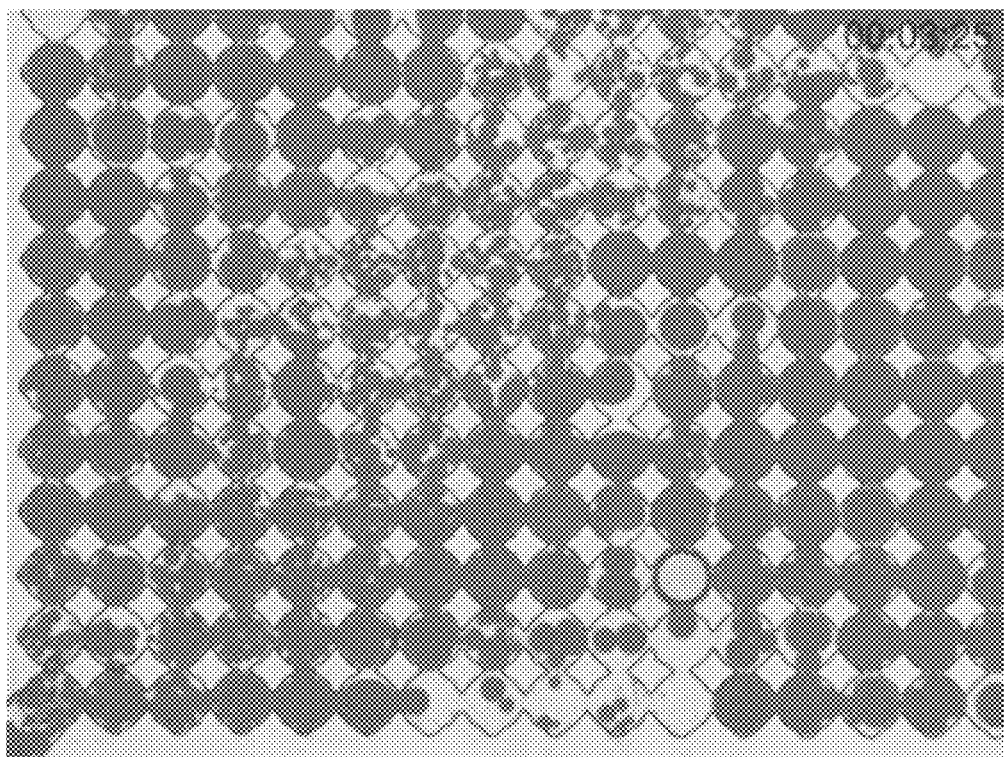

[Fig. 19]
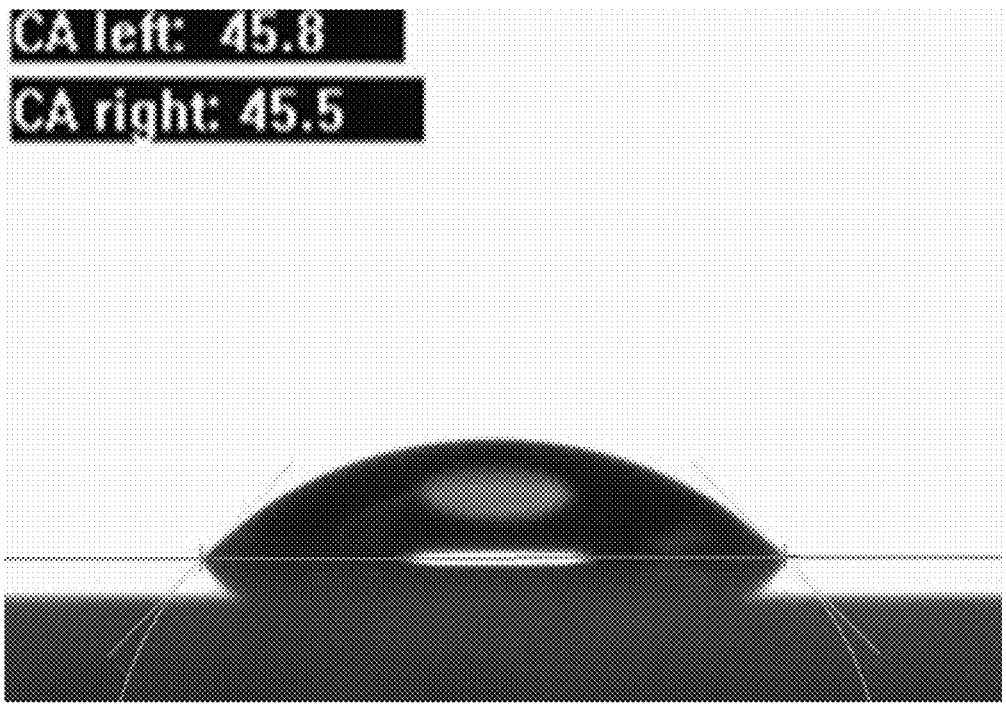
[Fig. 20]
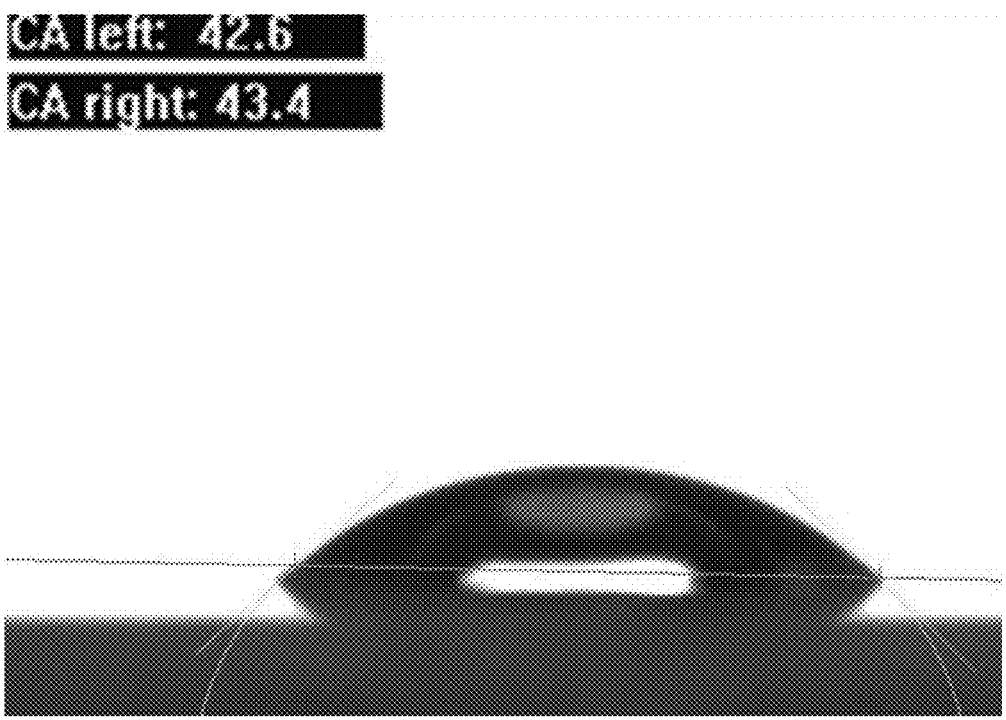

PERMEABILITY-ENHANCING FLOODING SYSTEM FOR TIGHT OIL RESERVOIRS, AND PREPARATION AND USE THEREOF

This application is the U.S. National Stage of International Application No. PCT/CN2020/124636, filed Oct. 29, 2020, which designates the U.S., published in Chinese, and claims priority under 35 U.S.C. § 119 or 365(c) to Chinese Application No. 201911139683.8, filed Nov. 20, 2019. The entire teachings of the above applications are incorporated herein by reference.

TECHNICAL FIELD

The invention belongs to the technical field of exploitation of tight oil reservoirs, and specifically relates to a permeability-enhancing flooding system for tight oil reservoirs and its preparation and use.

BACKGROUND

The recoverable resources of unconventional crude oil (tight oil, oil shale, shale oil, etc.) in China are huge. The new reserves of low permeability, tight and shale oil in the past 5 years have accounted for 70%-80% of the proven reserves, and gradually become an important strategic alternative resource for oil and gas exploration and development. Unconventional reservoirs such as tight and shale reservoirs in China have an average permeability of less than 0.3 mD, a porosity of 6%-15%, with micron-sized pores as the main oil storage space having an average throat radius of less than 400 nm. The mobility of the fluid reservoirs is poor and the saturation of the dynamic fluid is less than 30%, which greatly affects the mining efficiency. The tight oil reservoirs in Ordos, Songliao and Junggar basins in China have extremely poor fluidity, with an average mobility of less than 0.2 mD/mPa·s, which is substantially the same as that of ultra-heavy oil, making development difficult.

Aiming at the efficient development of the "sweet spot" of tight/shale oil reservoirs, with the goal of "fracture-controlled reserves", liquid systems such as linear vegetable gum and slickwater, which have the characteristics of high efficiency in carrying sand and reducing friction, are used to achieve the project goals such as initiation, fracturing and extension, and have played an extremely important role in the initial volumetric reconstruction of unconventional resources. However, the average hydrodynamic radius of linear vegetable gum and slickwater molecules is larger than 500 nm, which is much larger than the radius of tight and shale throats. The start-up pressure of water injection is high, and it cannot effectively enter the pores of micro-nano matrix, and it is impossible to continuously improve the recovery of unconventional oil reservoirs.

In recent years, the recovery technology of imbibition-replacement and energy replenishment has become a hot spot in the national and international research of efficient development of unconventional oil reservoirs. It mainly includes surfactant huff-puff, carbon dioxide huff-puff and nanofluid flooding, among which surfactant imbibition huff-puff as a tight-oil technology has good applicability. Although it has been applied in many tight oil fields (blocks) in North America, the core of imbibition is to maximize the capillary action of the injected medium. For water-wet reservoirs, the fluid injected after reservoir reconstruction can effectively enter the water-wet fracture or pore medium, and expand the swept volume of the wetting phase. However, most of the reservoirs in the oil storage space are relatively oil-wet, and the capillary force becomes capillary resistance, which will inhibit the oil-water imbibition replacement effect of the tight and shale matrix, and greatly reduce the degree of recovery. Furthermore, the hydrodynamic sizes of the existing surfactants and ion matching liquids are all in the micron level, and a part of the surfactants and the oil phase are emulsified in situ, which virtually increases the difficulty of the migration of crude oil in the matrix; finally, the existing fluids focus on improving the wettability of the reservoir in order to enhance the imbibition effect, but does not substantially solve the technical problem of low fluidity in crude oil reservoirs, and it is difficult to substantially improve the oil recovery of tight/shale reservoirs.

SUMMARY

In order to solve at least one of the above technical problems, the present invention provides a permeability-enhancing flooding system suitable for unconventional oil reservoirs such as tight and shale reservoirs, and its preparation and use.

In order to achieve the above object, the technical solutions as follows are proposed in the present invention.

The first aspect of the present invention provides a permeability-enhancing flooding system for tight oil reservoirs, which is composed of a surfactant, an oil-soluble substance and water, and present in a state of oil-in-water droplet, and has an external phase that is an aqueous solution containing the surfactant, and an inner phase that is the oil-soluble substance;

wherein the surfactant comprises one of nonionic gemini surfactants and anionic gemini surfactants, or a combination of two or more thereof.

In the present invention, preferably, the oil-soluble substance is one of linear olefin, furan, thiophene, cinene, and isoprene condensate, or a combination of two or more thereof. Preferably, the oil-soluble substance is one of linear olefin and cinene, or a combination of two or more thereof.

More preferably, the oil-soluble substance is undecene or cinene.

In the present invention, preferably, the total concentration of the surfactant and the oil-soluble substance in the permeability-enhancing flooding system is 0.05 wt. %-0.3 wt. %, preferably 0.1 wt. %-0.15 wt. %;

wherein the mass percentage of the surfactant is 75%-85%, and the mass percentage of the oil phase substances is 15%-25%. The total concentration of the surfactant and the oil-soluble substance in the permeability-enhancing flooding system is also referred to as working concentration or effective concentration in the present invention; and the permeability-enhancing flooding system can be diluted to this concentration during use.

In the present invention, preferably, the oil-in-water droplets have a particle size distribution of 3 nm-30 nm, and have good tolerance to monovalent sodium salt and divalent calcium salt. The particle size change rate thereof is less than 5% within 90 days.

A preferable embodiment of the present invention provides a nonionic permeability-enhancing flooding system, wherein the surfactant is a nonionic gemini surfactant, and the nonionic gemini surfactant includes di-substituted diphenyl ether dicarboxylate having a specific structural formula as follows:

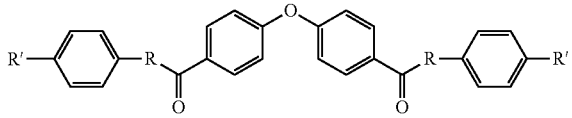

wherein R is a carboxyl group, an amino group, an ester group, an alkyl polyoxyethylene ether segment or an alkylphenol polyoxyethylene ether segment; R' is a $C_{9-12}$ alkyl group.

In this preferable embodiment, by adjusting the alkyl group R' in di-substituted diphenyl ether dicarboxylate as the nonionic gemini surfactant to a $C_{9-12}$ alkyl group, and changing the structure of the oil-soluble substance to olefins, the nonionic permeability-enhancing flooding system can be self-emulsified without addition of a solubilizer, and has six characteristics of small size liquid, small size oil, high interfacial activity, biphase wetting, demulsification/dehydration and anti-adsorption. The synthesis steps of the nonionic gemini surfactants can be found in patent application publication CN109851530A, and are composed of acylating chlorination reaction and one-step esterification reaction, which is mild in the reaction conditions, simple to operate, and easy to separate and purify for the product. The specific reaction mechanism is as follows.

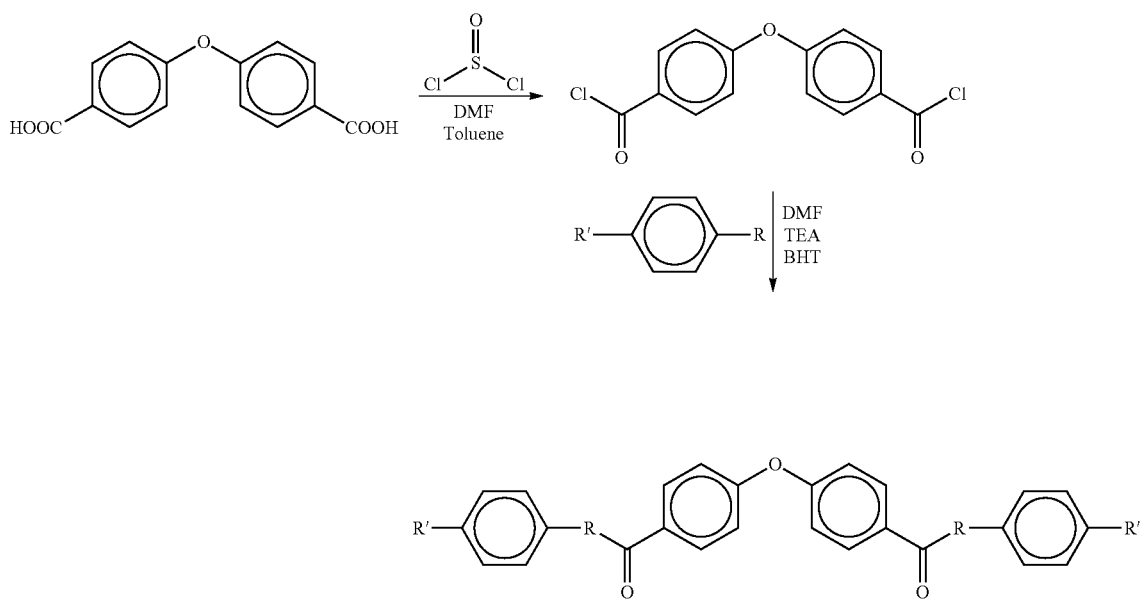

The synthesis includes steps of:

1) subjecting 4,4'-diphenyl ether dicarboxylic acid to acylating chlorination reaction to obtain 4,4'-oxybisbenzoic chloride;

2) subjecting 4,4'-oxybisbenzoic chloride to substitution reaction with benzene derivatives to obtain the target product, wherein R is a carboxyl group, an amino group, an ester group, alkyl polyoxyethylene ether, alkylphenol polyoxyethylene ether, or the like, and R' is a $C_{9-12}$ alkyl group.

In a specific embodiment of the present invention, the disubstituted diphenyl ether dicarboxylate is di(nonylphenol polyoxyethylene ether)-substituted diphenyl ether dicarboxylate with a structural formula of:

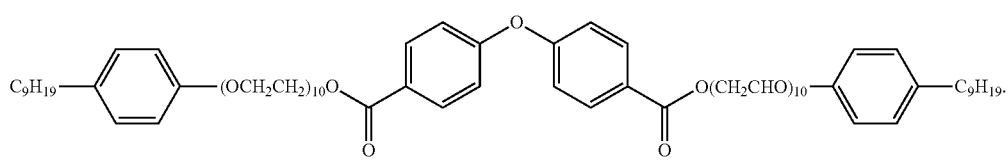

In this specific embodiment, the oil-in-water droplets in the nonionic permeability-enhancing flooding system has a particle size of less than 30 nm, as confirmed by a wide-angle laser light scattering. The micro-etching model confirms that the nonionic permeability-enhancing flooding system can effectively weaken the association between the various components of crude oil, produce an effect of small-size oil, and increase the seepage capacity of the crude oil reservoir under simulated reservoir conditions. Both the microscopic swept volume and the displacement efficiency self-emulsified without addition of a solubilizer, and has six characteristics of small size liquid, small size oil, high interfacial activity, biphase wetting, demulsification/dehydration and anti-adsorption. The synthesis steps of the anionic gemini surfactants can be found in patent application publication CN109678720A, and are composed of one-step amine alkylation reaction and one-step sulfonation reaction, which is mild in the reaction conditions, simple to operate, and easy to separate and purify for the product. The specific reaction mechanism is as follows.

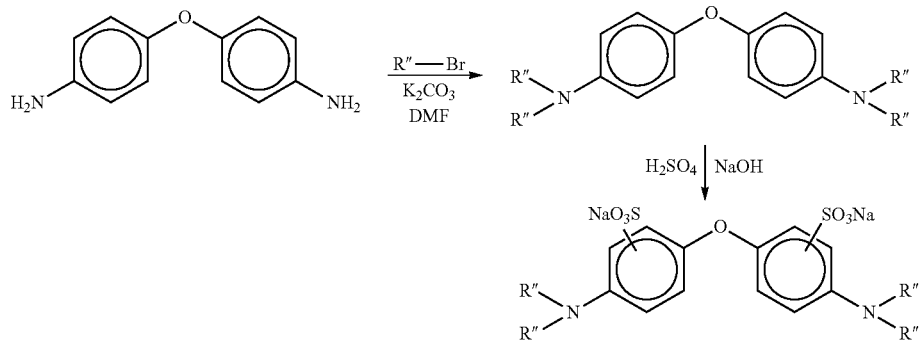

exceed 90%. The interfacial tension evaluation result confirms that the equilibrium interfacial tension between the nonionic permeability-enhancing flooding system and the simulated oil from Jimsar, Xinjiang is 0.02 mN/m at 80° C., showing obvious superiority. The contact angle evaluation result confirms that the nonionic permeability-enhancing flooding system has a biphase wetting characteristic, and the contact angles with hydrophilic and lipophilic interfaces are 46.6° and 69.3°, respectively. The evaluation results of demulsification/dehydration show that the nonionic permeability-enhancing flooding system can effectively reduce the "water-in-oil" inverse emulsification phenomenon of crude oil. At 80° C., the demulsification/dehydration rate after 5 hours can reach 88.9%, and the apparent viscosity of crude oil can be reduced. The viscosity reduction rate of crude Oil from lower sweet spot in Jimsar is up to 80% in the temperature range of 30° C.-70° C., which effectively improves the flowability of crude oil.

A preferable embodiment of the present invention provides an anionic permeability-enhancing flooding system, wherein the surfactant is an anionic gemini surfactant including tetraalkyl-substituted diphenyl ether sulfonate having a specific structural formula as follows:

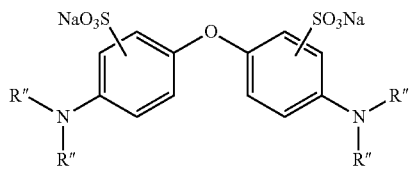

wherein R" is a $C_{14-16}$ alkyl group.

In this preferable embodiment, by adjusting the alkyl group R" in tetraalkyl-substituted diphenyl ether sulfonate as the anionic gemini surfactant in the anionic permeability-enhancing flooding system to a $C_{14-16}$ alkyl group, and changing the structure of the oil-soluble substance to olefins, the anionic permeability-enhancing flooding system can be wherein R" is a $C_{14-16}$ alkyl group.

The synthesis includes steps of:
1) subjecting 4,4'-diaminodiphenyl ether and brominated alkane to amine alkylation reaction to obtain N,N,N',N'-tetraalkyl-substituted diphenyl ether;
2) subjecting N,N,N',N'-tetraalkyl-substituted diphenyl ether and concentrated sulfuric acid to sulfonation reaction to obtain the target product of N,N,N',N'-tetraalkyl-substituted diphenyl ether sulfonate.

In a specific embodiment of the present invention, the anionic gemini surfactant is tetracetyl-substituted diphenyl ether sulfonate having a structural formula of:

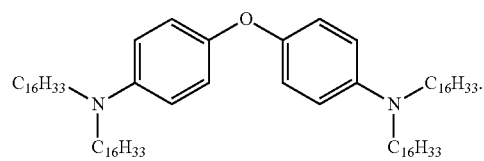

In this specific embodiment, the anionic permeability-enhancing flooding system is a homogeneous and transparent "oil-in-water" like solution having a particle size distribution of the solution droplets of less than 30 nm at the working concentration. The water may be distilled water, deionized water or inorganic salt water. The particle size of the solution droplets remains stable for a long time, having a particle size change rate of less than 5% within 90 days. The particle size of the droplets in the anionic permeability-enhancing flooding system is less than 30 nm, as confirmed by the wide-angle laser light scattering. The micro-etching model confirms that the anionic permeability-enhancing flooding system can effectively weaken the association between the various components of crude oil, produce an effect of small-size oil, and increase the seepage capacity of the crude oil reservoir under simulated reservoir conditions. Both the microscopic swept volume and the displacement efficiency exceed 90%. The interfacial tension evaluation result confirms that the equilibrium interfacial tension between the anionic permeability-enhancing flooding system and the simulated oil from Jimsar, Xinjiang is 0.1 mN/m at 80° C., showing obvious superiority. The contact angle evaluation result confirms that the anionic permeability-enhancing flooding system has a biphase wetting characteristic, and the contact angles with hydrophilic and lipophilic interfaces are 46.0° and 63.9°, respectively. The evaluation results of demulsification/dehydration show that the anionic permeability-enhancing flooding system can effectively reduce the "water-in-oil" inverse emulsification phenomenon of crude oil. At 80° C., the demulsification/dehydration rate after 5 hours can reach 84.4%, and the apparent viscosity of crude oil can be reduced. The viscosity reduction rate of crude oil from lower sweet spot in Jimsar is up to 80% in the temperature range of 30° C.-70° C., which effectively improves the flowability of crude oil.

The permeability-enhancing flooding system of the present invention is suitable for the permeability enhancement and oil displacement of unconventional oil reservoirs such as tight or shale reservoirs, so as to improve the recovery. In the present invention, by adjusting the alkyl group in di-substituted diphenyl ether dicarboxylate as the surfactant from octyl group to nonyl and dodecyl groups, or adjusting the alkyl group in tetraalkyl-substituted diphenyl ether sulfonate from dodecyl group to cetyl group, and changing the structure of the oil-soluble substance to olefins, the permeability-enhancing flooding system can be self-emulsified without addition of a solubilizer, and has six characteristics of small size liquid, small size oil, high interfacial activity, biphase wetting, demulsification/dehydration and anti-adsorption.

The permeability-enhancing flooding system of the present invention can disperse the crude oil into small sizes during migration process after encountering crude oil, and improve the seepage capacity. It has high interfacial activity, with an interfacial tension with the crude oil of up to a level of $10^{-2}$ mN/m, and an displacement efficiency of crude oil of more than 90%. It has biphase wetting ability, with a contact angle with hydrophilic and lipophilic interfaces of about 45°-70°. It has demulsification/dehydration ability, can weaken the "water-in-oil" inverse emulsification phenomenon of crude oil, and reduce the apparent viscosity of crude oil. It has good anti-adsorption ability, with a particle size substantially unchanged when adsorbed in the oil sands for 72 h.

According to a specific embodiment of the present invention, the permeability-enhancing flooding system is a homogeneous and transparent "oil-in-water" like solution, having a particle size distribution of the solution droplets of less than 30 nm at the working concentration. The water may be distilled water, deionized water or inorganic salt water. The particle size of the solution droplets remains stable for a long time, with a particle size change rate of less than 5% within 90 days, where the "particle size change rate" refers to the variation amplitude of the particle size.

When the water is an inorganic salt water, the permeability-enhancing flooding system further comprising an inorganic salt in a mass content of 20% or less.

Preferably, the inorganic salt is sodium chloride or calcium chloride.

The second aspect of the present invention provides a method for preparing the above-mentioned permeability-enhancing flooding system, comprising steps of:

S1. mixing the surfactant and the oil-soluble substance uniformly to obtain a homogeneous mixture solution; or mixing the surfactant, the oil-soluble substance, and an aqueous solution containing an inorganic salt uniformly to obtain a homogeneous mixture solution;

S2. diluting the homogeneous mixture solution with water or inorganic salt water to a working concentration to obtain the permeability-enhancing flooding system.

Preferably, the mixing and diluting are carried out by stirring at 10 rpm-400 rpm, preferably 100 rpm.

In a preferable embodiment of the present invention, the method for preparing the nonionic permeability-enhancing flooding system includes the following steps:

1) mixing di-substituted diphenyl ether dicarboxylate as the nonionic gemini surfactant, the oil-soluble substance and water uniformly under stirring until being completely dissolved to obtain a homogeneous mixture solution;

2) diluting the homogeneous mixture solution prepared in step 1) with deionized water or inorganic salt water under stirring to the working concentration (0.05 wt. %-0.3 wt. %, preferably 0.1 wt. %-0.15 wt. %) until being completely dissolved, to obtain a nonionic permeability-enhancing flooding material for an improved oil recovery.

In another preferable embodiment of the present invention, the method for preparing the anionic permeability-enhancing flooding system includes the following steps:

1) mixing tetraalkyl-substituted diphenyl ether sulfonate as the anionic gemini surfactant, the oil-soluble substance and water uniformly under stirring until being completely dissolved to obtain a homogeneous mixture solution;

2) diluting the homogeneous mixture solution prepared in step 1) with deionized water or inorganic salt water under stirring to the working concentration (0.05 wt. %-0.3 wt. %, preferably 0.1 wt. %-0.15 wt. %) until being completely dissolved, to obtain an anionic permeability-enhancing flooding material for an improved oil recovery.

The third aspect of the present invention provides use of the above-mentioned permeability-enhancing flooding system in the exploitation of tight oil reservoirs and shale oil reservoirs.

As compared with the prior art, the present invention has the following advantages and effects:

1) Two types of gemini surfactants, di-substituted diphenyl ether dicarboxylate and tetraalkyl-substituted diphenyl ether sulfonate, and an oil-soluble substance are introduced in the present invention to prepare nonionic and anionic permeability-enhancing flooding systems with mild reaction conditions and simple preparation process, which can be used for industrial mass production, and completely solve the technical difficulty of agglomeration tendency and poor stability of the "oil-in-water" system under low-energy conditions.

2) The nonionic and anionic permeability-enhancing flooding systems obtained by the present invention have six characteristics: it has a size of less than 30 nm, and thus have the ability to enter the micro-nano pores of tight oil reservoirs; they can effectively weaken the association between various components of crude oil and produce an effect of small size oil, and increase the seepage capacity of crude oil reservoirs under simulated reservoir conditions; they have ultra-low interfacial tension and excellent oil displacement ability; they have good wetting ability for both hydrophilic and lipophilic reservoirs, and have good reservoir applicability; they can effectively weaken the "water-in-oil" inverse emulsification phenomenon of crude oil, reduce the apparent viscosity of crude oil, and improve the flowability of crude oil; they have good anti-adsorption ability, with a particle size substantially unchanged when adsorbed in oil sands for 72 hours.

3) The nonionic and anionic permeability-enhancing flooding systems obtained by the present invention can be used in low permeability reservoirs, ultra-low permeability reservoirs, tight reservoirs and shale oil and gas to improve recovery, and have very broad application prospects.

BRIEF DESCRIPTION OF DRAWINGS

FIG. 1 is a particle size distribution diagram of the nonionic permeability-enhancing flooding system prepared in Example 1.

FIG. 2 is a representative photograph of the nonionic permeability-enhancing flooding system prepared in Example 1, which converts the simulated oil from Jimsar into "small-size oil".

FIG. 3 is a graph of interfacial tension between the permeability-enhancing flooding system prepared in Examples 1 to 4 and the simulated oil from Jimsar.

FIG. 4 is the contact angle between the nonionic permeability-enhancing flooding system prepared in Example 1 and the hydrophilic interface of $SiO_2$.

FIG. 5 is the contact angle between the nonionic permeability-enhancing flooding system prepared in Example 1 and the lipophilic interface of $SiO_2$.

FIG. 6 shows the demulsification/dehydration effect of the permeability-enhancing flooding system prepared in Examples 1 to 4 with the "water-in-oil" crude oil from lower sweet spot in Jimsar.

FIG. 7 shows the viscosity reduction effect of the permeability-enhancing flooding system prepared in Examples 1 to 4 with the "water-in-oil" crude oil from lower sweet spot in Jimsar.

FIG. 8 shows the particle size changes of the permeability-enhancing flooding system prepared in Examples 1 to 4 after adsorbed in the oil sands for different periods of time.

FIG. 9 is a particle size distribution diagram of the anionic permeability-enhancing flooding system prepared in Example 2.

FIG. 10 is a representative photograph of the anionic permeability-enhancing flooding system prepared in Example 2, which converts the simulated oil from Jimsar into "small-size oil".

FIG. 11 is the contact angle between the anionic permeability-enhancing flooding system prepared in Example 2 and the hydrophilic interface of $SiO_2$.

FIG. 12 is the contact angle between the anionic permeability-enhancing flooding system prepared in Example 2 and the lipophilic interface of $SiO_2$.

FIG. 13 is a particle size distribution diagram of the nonionic permeability-enhancing flooding system prepared in Example 3.

FIG. 14 is a representative photograph of the nonionic permeability-enhancing flooding system prepared in Example 3, which converts the simulated oil from Jimsar into "small-size oil".

FIG. 15 is the contact angle between the nonionic permeability-enhancing flooding system prepared in Example 3 and the hydrophilic interface of $SiO_2$.

FIG. 16 is the contact angle between the nonionic permeability-enhancing flooding system prepared in Example 3 and the lipophilic interface of $SiO_2$.

FIG. 17 is a particle size distribution diagram of the anionic permeability-enhancing flooding system prepared in Example 4.

FIG. 18 is a representative photograph of the anionic permeability-enhancing flooding system prepared in Example 4, which converts the simulated oil from Jimsar into "small-size oil".

FIG. 19 is the contact angle between the anionic permeability-enhancing flooding system prepared in Example 4 and the hydrophilic interface of $SiO_2$.

FIG. 20 is the contact angle between the anionic permeability-enhancing flooding system prepared in Example 4 and the lipophilic interface of $SiO_2$.

DETAILED DESCRIPTION OF THE PREFERRED EMBODIMENTS

In order to explain the present invention more clearly, the present invention will be further described with reference to preferred embodiments. Those skilled in the art should understand that the content described below is illustrative rather than restrictive, and should not limit the protection scope of the present invention.

Example 1

This Example provides a nonionic permeability-enhancing flooding system and a preparation method thereof comprising main steps as follows.

1. Preparation of a Nonionic Gemini Surfactant, Di(Nonylphenol Polyoxyethylene Ether)-Substituted Diphenyl Ether Dicarboxylate 4,4'-diphenyl ether dicarboxylic acid was subjected to acylating chlorination reaction to obtain 4,4'-oxybisbenzoic chloride;

4,4'-oxybisbenzoic chloride and nonylphenol polyoxyethylene ether were subjected to esterification to obtain the target product, di(nonylphenol polyoxyethylene ether)-substituted diphenyl ether dicarboxylate.

In this synthesis route, the starting material 4,4'-diphenyl ether dicarboxylic acid was activated by acylating chlorination to obtain the intermediate acyl-chloride product; then the acyl chloride was esterified with nonylphenol polyoxyethylene ether as an surfactant so that two molecules of nonylphenol polyoxyethylene ether were connected to two symmetric positions of diphenyl ether to obtain the target product, di(nonylphenol polyoxyethylene ether)-substituted diphenyl ether dicarboxylate as the nonionic surfactant.

2. Preparation of Nonionic Permeability-Enhancing Flooding System (1) 5 parts by weight of sodium chloride, 15 parts by weight of undecene, 60 parts of di(nonylphenol polyoxyethylene ether)-substituted diphenyl ether dicarboxylate as the nonionic gemini surfactant, and 20 parts of water were weighed, placed into a reactor, and mixed under stirring at 100 rpm until completely dissolved, to give a homogeneous mixture solution.

(2) 0.15 part by weight of the above homogeneous mixture solution and 99.8 parts by weight of water were weighed, placed into a reactor, and mixed under stirring at 100 rpm until completely dissolved, to obtain a nonionic permeability-enhancing flooding system having an effective concentration of 0.11%, a homogeneous and transparent appearance, and being stable for a long time. The preparation method of the nonionic permeability-enhancing flooding system uses mild conditions and simple preparation process, can be used for industrial mass production, and completely solves the technical difficulty of easy agglomeration and poor stability of the "oil-in-water" system under low-energy conditions.

The following inspections and tests were carried out on the nonionic permeability-enhancing flooding system.

As measured by dynamic light scattering (BI-200SM, Brookhaven) at 25° C. and a scattering angle of 90°, the nonionic permeability-enhancing flooding system had an average particle size of 10.1 nm (see FIG. 1), and thus has a capacity of entering micro-nano pores of tight oil reservoirs.

As determined by a self-built platform with integrated micro-etching model (size 1.5 cm×1.5 cm, pore depth 15 μm, throat depth 2 μm), micro-nano-scale displacement platform, and optical microscope (Leica M165FC), at 25° C., the above-mentioned nonionic permeability-enhancing flooding system can convert a simulated oil from Jimsar, Xinjiang (having a volume ratio of Jimsar crude oil to kerosene of 10:4, and a viscosity of 63.4 mPa·s at 50° C.) into "small size oil" (see FIG. 2). It shows that the nonionic permeability-enhancing flooding system can effectively weaken the association between the various components of crude oil, produce an effect of small-size oil, and increase the seepage capacity of the crude oil reservoir under simulated reservoir conditions.

As measured by Spinning Drop Interface tensiometer, the equilibrium interfacial tension between the above-mentioned nonionic permeability-enhancing flooding system and the simulated oil from Jimsar, Xinjiang is 0.02 mN/m at 80° C. and 6000 rpm (see FIG. 3). It shows that the nonionic permeability-enhancing flooding system has ultra-low interfacial tension and excellent oil displacement ability.

As measured by Dataphysics contact angle tester, the contact angle between the nonionic permeability-enhancing flooding system and the hydrophilic interface of $SiO_2$ is 46.6° (see FIG. 4), and the contact angle with the lipophilic interface of $SiO_2$ is 69.3° (See FIG. 5), at 25° C. It shows that the nonionic permeability-enhancing flooding system has good wetting ability for both hydrophilic and lipophilic reservoirs, and has good reservoir applicability.

When 7.5 mg of the above-mentioned nonionic permeability-enhancing flooding system is added to 10 g of "water-in-oil" crude oil from lower sweet spot in Jimsar at 80° C., the demulsification/dehydration rate after 5 hours can reach 88.9% (see FIG. 6). As measured by RS600 rheometer, the above-mentioned nonionic permeability-enhancing flooding material for an improved recovery has a viscosity reduction rate of 80% or more for the "water-in-oil" crude oil from lower sweet spot in Jimsar, at 30° C., 40° C., 50° C., 60° C., or 70° C. (see FIG. 7). It shows that the nonionic permeability-enhancing flooding system can effectively reduce the "water-in-oil" inverse emulsification phenomenon of crude oil, reduce the apparent viscosity of crude oil, and improve the flowability of crude oil.

150 g of the above-mentioned nonionic permeability-enhancing flooding system is mixed with 10 g of oil sands and shaken at 80° C. for different periods of time, and the supernatant liquid is taken to determine the particle size. After 72 hours of adsorption, the particle size of the nonionic permeability-enhancing flooding system is substantially unchanged, about 10 nm (see FIG. 8). It shows that the nonionic permeability-enhancing flooding system has good anti-adsorption ability, and the particle size is substantially unchanged when adsorbed in the oil sands for 72 h.

Example 2

This Example provides an anionic permeability-enhancing flooding system and a preparation method thereof comprising main steps as follows.

1. Preparation of a Gemini Surfactant, N,N,N',N'-Tetracetyl-Substituted Diphenyl Ether Sulfonate 4,4'-diaminodiphenyl ether and brominated hexadecane were subjected to amine alkylation reaction to obtain N,N,N',N'-tetracetyl-substituted diphenyl ether;

N,N,N',N'-tetracetyl-substituted diphenyl ether and concentrated sulfuric acid were subjected to sulfonation reaction to obtain the target product, N,N,N',N'-tetraalkyl-substituted diphenyl ether sulfonate.

2. Preparation of Aonionic Permeability-Enhancing Flooding System (1) 1 parts by weight of calcium chloride, 15 parts by weight of cinene, 65 parts of tetracetyl-substituted diphenyl ether sulfonate as the gemini surfactant, and 19 parts of water were weighed, placed into a reactor, and mixed under stirring at 200 rpm until completely dissolved, to give a homogeneous mixture solution.

(2) 0.2 part by weight of the above homogeneous mixture solution and 95 parts by weight of water were weighed, placed into a reactor, and mixed under stirring at 200 rpm until completely dissolved, to obtain an anionic permeability-enhancing flooding material for an improved recovery, having an effective concentration of 0.17%, a homogeneous and transparent appearance, and being stable for a long time. The preparation method of the anionic permeability-enhancing flooding system uses mild conditions and simple preparation process, can be used for industrial mass production, and completely solves the technical difficulty of easy agglomeration and poor stability of the "oil-in-water" system under low-energy conditions.

The following inspections and tests were carried out on the anionic permeability-enhancing flooding system.

As measured by dynamic light scattering (BI-200SM, Brookhaven) at 25° C. and a scattering angle of 90°, the anionic permeability-enhancing flooding system had an average particle size of 11.3 nm (see FIG. 9), and thus has a capacity of entering micro-nano pores of tight oil reservoirs.

As determined by a self-built platform with integrated micro-etching model (size 1.5 cm×1.5 cm, pore depth 15 μm, throat depth 2 μm), micro-nano-scale displacement platform, and optical microscope (Leica M165FC), at 25° C., the above-mentioned anionic permeability-enhancing flooding system can convert a simulated oil from Jimsar, Xinjiang (having a volume ratio of Jimsar crude oil to kerosene of 10:4, and a viscosity of 63.4 mPa·s at 50° C.) into "small size oil" (see FIG. 10). It shows that the anionic permeability-enhancing flooding system can effectively weaken the association between the various components of crude oil, produce an effect of small-size oil, and increase the seepage capacity of the crude oil reservoir under simulated reservoir conditions.

As measured by Spinning Drop Interface tensiometer, the equilibrium interfacial tension between the above-mentioned anionic permeability-enhancing flooding system and the simulated oil from Jimsar, Xinjiang is 0.1 mN/m at 80° C. and 6000 rpm (see FIG. 3). It shows that the anionic permeability-enhancing flooding system has ultra-low interfacial tension and excellent oil displacement ability.

As measured by Dataphysics contact angle tester, the contact angle between the anionic permeability-enhancing flooding system and the hydrophilic interface of $SiO_2$ is 46.0° (see FIG. 11), and the contact angle with the lipophilic interface of $SiO_2$ is 63.9° (See FIG. 12), at 25° C. It shows that the anionic permeability-enhancing flooding system has good wetting ability for both hydrophilic and lipophilic reservoirs, and has good reservoir applicability.

When 7.5 mg of the above-mentioned anionic permeability-enhancing flooding system is added to 10 g of "water-in-oil" crude oil from lower sweet spot in Jimsar at 80° C., the demulsification/dehydration rate after 5 hours can reach 84.4% (see FIG. 6). As measured by RS600 rheometer, the above-mentioned anionic permeability-enhancing flooding system has a viscosity reduction rate of 80% or more for the "water-in-oil" crude oil from lower sweet spot in Jimsar, at 30° C., 40° C., 50° C., 60° C., or 70° C. (see FIG. 7). It shows that the anionic permeability-enhancing flooding system can effectively reduce the "water-in-oil" inverse emulsification phenomenon of crude oil, reduce the apparent viscosity of crude oil, and improve the flowability of crude oil.

150 g of the above-mentioned anionic permeability-enhancing flooding system is mixed with 10 g of oil sands and shaken at 80° C. for different periods of time, and the supernatant liquid is taken to determine the particle size. After 72 hours of adsorption, the particle size of the anionic permeability-enhancing flooding system is substantially unchanged, about 15-20 nm (see FIG. 8). It shows that the anionic permeability-enhancing flooding system has good anti-adsorption ability, and the particle size is substantially unchanged when adsorbed in the oil sands for 72 h.

Example 3

This Example provides a nonionic permeability-enhancing flooding system and a preparation method thereof comprising main steps as follows.

1. Preparation of a Nonionic Gemini Surfactant, Di(Dodecylphenol Polyoxyethylene Ether)-Substituted Diphenyl Ether Dicarboxylate 4,4'-diphenyl ether dicarboxylic acid was subjected to acylating chlorination reaction to obtain 4,4'-oxybisbenzoic chloride;

4,4'-oxybisbenzoic chloride and dodecylphenol polyoxyethylene ether were subjected to esterification to obtain the target product, di(dodecylphenol polyoxyethylene ether)-substituted diphenyl ether dicarboxylate.

In this synthesis route, the starting material 4,4'-diphenyl ether dicarboxylic acid was activated by acylating chlorination to obtain the intermediate acyl-chloride product; then the acyl chloride was esterified with dodecylphenol polyoxyethylene ether as an surfactant so that two molecules of dodecylphenol polyoxyethylene ether were connected to two symmetric positions of diphenyl ether to obtain the target product, di(dodecylphenol polyoxyethylene ether)-substituted diphenyl ether dicarboxylate, as the nonionic surfactant.

2. Preparation of Nonionic Permeability-Enhancing Flooding System (1) 5 parts by weight of sodium chloride, 15 parts by weight of undecene, 60 parts of di(dodecylphenol polyoxyethylene ether)-substituted diphenyl ether dicarboxylate as the nonionic gemini surfactant, and 20 parts of water were weighed, placed into a reactor, and mixed under stirring at 100 rpm until completely dissolved, to give a homogeneous mixture solution.

(2) 0.15 part by weight of the above homogeneous mixture solution and 99.8 parts by weight of water were weighed, placed into a reactor, and mixed under stirring at 100 rpm until completely dissolved, to obtain a nonionic permeability-enhancing flooding system having an effective concentration of 0.11%, a homogeneous and transparent appearance, and being stable for a long time. The preparation method of the nonionic permeability-enhancing flooding system uses mild conditions and simple preparation process, can be used for industrial mass production, and completely solves the technical difficulty of easy agglomeration and poor stability of the "oil-in-water" system under low-energy conditions.

The following inspections and tests were carried out on the nonionic permeability-enhancing flooding system.

As measured by dynamic light scattering (BI-200SM, Brookhaven) at 25° C. and a scattering angle of 90°, the nonionic permeability-enhancing flooding system had an average particle size of 11.1 nm (see FIG. 13), and thus has a capacity of entering micro-nano pores of tight oil reservoirs.

As determined by a self-built platform with integrated micro-etching model (size 1.5 cm×1.5 cm, pore depth 15 throat depth 2 μm), micro-nano-scale displacement platform, and optical microscope (Leica M165FC), at 25° C., the above-mentioned nonionic permeability-enhancing flooding system can convert a simulated oil from Jimsar, Xinjiang (having a volume ratio of Jimsar crude oil to kerosene of 10:4, and a viscosity of 63.4 mPa·s at 50° C.) into "small size oil" (see FIG. 14). It shows that the nonionic permeability-enhancing flooding system can effectively weaken the association between the various components of crude oil, produce an effect of small-size oil, and increase the seepage capacity of the crude oil reservoir under simulated reservoir conditions.

As measured by Spinning Drop Interface tensiometer, the equilibrium interfacial tension between the above-mentioned nonionic permeability-enhancing flooding system and the simulated oil from Jimsar, Xinjiang is 0.025 mN/m at 80° C. and 6000 rpm (see FIG. 3). It shows that the nonionic permeability-enhancing flooding system has ultra-low interfacial tension and excellent oil displacement ability.

As measured by Dataphysics contact angle tester, the contact angle between the nonionic permeability-enhancing flooding system and the hydrophilic interface of $SiO_2$ is 45.1° (see FIG. 15), and the contact angle with the lipophilic interface of $SiO_2$ is 45.5° (See FIG. 16), at 25° C. It shows that the nonionic permeability-enhancing flooding system has good wetting ability for both hydrophilic and lipophilic reservoirs, and has good reservoir applicability.

When 7.5 mg of the above-mentioned nonionic permeability-enhancing flooding system is added to 10 g of "water-in-oil" crude oil from lower sweet spot in Jimsar at 80° C., the demulsification/dehydration rate after 5 hours can reach 84.4% (see FIG. 6). As measured by RS600 rheometer, the above-mentioned nonionic permeability-enhancing flooding material for an improved recovery has a viscosity reduction rate of 80% or more for the "water-in-oil" crude oil from lower sweet spot in Jimsar, at 30° C., 40° C., 50° C., 60° C., or 70° C. (see FIG. 7). It shows that the nonionic permeability-enhancing flooding system can effectively reduce the "water-in-oil" inverse emulsification phenomenon of crude oil, reduce the apparent viscosity of crude oil, and improve the flowability of crude oil.

150 g of the above-mentioned nonionic permeability-enhancing flooding system is mixed with 10 g of oil sands and shaken at 80° C. for different periods of time, and the supernatant liquid is taken to determine the particle size. After 72 hours of adsorption, the particle size of the nonionic permeability-enhancing flooding system is substantially unchanged, about 10 nm (see FIG. 8). It shows that the nonionic permeability-enhancing flooding system has good anti-adsorption ability, and the particle size is substantially unchanged when adsorbed in the oil sands for 72 h.

Example 4

This Example provides an anionic permeability-enhancing flooding system and a preparation method thereof comprising main steps as follows.

1. Preparation of a Gemini Surfactant, N,N,N',N'-Tetramyristyl-Substituted Diphenyl Ether Sulfonate 4,4'-diaminodiphenyl ether and brominated tetradecane were subjected to amine alkylation reaction to obtain N,N,N',N'-tetramyristyl-substituted diphenyl ether;

N,N,N',N'-tetramyristyl-substituted diphenyl ether and concentrated sulfuric acid were subjected to sulfonation reaction to obtain the target product, N,N,N',N'-tetramyristyl-substituted diphenyl ether sulfonate.

2. Preparation of Aonionic Permeability-Enhancing Flooding System (1) 1 parts by weight of calcium chloride, 15 parts by weight of cinene, 65 parts of tetramyristyl-substituted diphenyl ether sulfonate as the gemini surfactant, and 19 parts of water were weighed, placed into a reactor, and mixed under stirring at 200 rpm until completely dissolved, to give a homogeneous mixture solution.

(2) 0.2 part by weight of the above homogeneous mixture solution and 95 parts by weight of water were weighed, placed into a reactor, and mixed under stirring at 200 rpm until completely dissolved, to obtain an anionic permeability-enhancing flooding material for an improved recovery, having an effective concentration of 0.17%, a homogeneous and transparent appearance, and being stable for a long time. The preparation method of the anionic permeability-enhancing flooding system uses mild conditions and simple preparation process, can be used for industrial mass production, and completely solves the technical difficulty of easy agglomeration and poor stability of the "oil-in-water" system under low-energy conditions.

The following inspections and tests were carried out on the anionic permeability-enhancing flooding system.

As measured by dynamic light scattering (BI-200SM, Brookhaven) at 25° C. and a scattering angle of 90°, the anionic permeability-enhancing flooding system had an average particle size of 7.5 nm (see FIG. 17), and thus has a capacity of entering micro-nano pores of tight oil reservoirs.

As determined by a self-built platform with integrated micro-etching model (size 1.5 cm×1.5 cm, pore depth 15 μm, throat depth 2 μm), micro-nano-scale displacement platform, and optical microscope (Leica M165FC), at 25° C., the above-mentioned anionic permeability-enhancing flooding system can convert a simulated oil from Jimsar, Xinjiang (having a volume ratio of Jimsar crude oil to kerosene of 10:4, and a viscosity of 63.4 mPa·s at 50° C.) into "small size oil" (see FIG. 18). It shows that the anionic permeability-enhancing flooding system can effectively weaken the association between the various components of crude oil, produce an effect of small-size oil, and increase the seepage capacity of the crude oil reservoir under simulated reservoir conditions.

As measured by Spinning Drop Interface tensiometer, the equilibrium interfacial tension between the above-mentioned anionic permeability-enhancing flooding system and the simulated oil from Jimsar, Xinjiang is 0.13 mN/m at 80° C. and 6000 rpm (see FIG. 3). It shows that the anionic permeability-enhancing flooding system has ultra-low interfacial tension and excellent oil displacement ability.

As measured by Dataphysics contact angle tester, the contact angle between the anionic permeability-enhancing flooding system and the hydrophilic interface of $SiO_2$ is 45.7° (see FIG. 19), and the contact angle with the lipophilic interface of $SiO_2$ is 43.0° (See FIG. 20), at 25° C. It shows that the anionic permeability-enhancing flooding system has good wetting ability for both hydrophilic and lipophilic reservoirs, and has good reservoir applicability.

When 7.5 mg of the above-mentioned anionic permeability-enhancing flooding system is added to 10 g of "water-in-oil" crude oil from lower sweet spot in Jimsar at 80° C., the demulsification/dehydration rate after 5 hours can reach 62.2% (see FIG. 6). As measured by RS600 rheometer, the above-mentioned anionic permeability-enhancing flooding system has a viscosity reduction rate of 80% or more for the "water-in-oil" crude oil from lower sweet spot in Jimsar, at 30° C., 40° C., 50° C., 60° C., or 70° C. (see FIG. 7). It shows that the anionic permeability-enhancing flooding system can effectively reduce the "water-in-oil" inverse emulsification phenomenon of crude oil, reduce the apparent viscosity of crude oil, and improve the flowability of crude oil.

150 g of the above-mentioned anionic permeability-enhancing flooding system is mixed with 10 g of oil sands and shaken at 80° C. for different periods of time, and the supernatant liquid is taken to determine the particle size. After 72 hours of adsorption, the particle size of the anionic permeability-enhancing flooding system is substantially unchanged, about 10 nm (see FIG. 8). It shows that the anionic permeability-enhancing flooding system has good anti-adsorption ability, and the particle size is substantially unchanged when adsorbed in the oil sands for 72 h.

Comparative Example 1

This Comparative Example provides a nonionic permeability-enhancing flooding system and a preparation method thereof comprising main steps as follows.

(1) 5 parts by weight of sodium chloride, 15 parts by weight of undecene, 60 parts of di(octylphenol polyoxyethylene ether)-substituted diphenyl ether dicarboxylate as the nonionic gemini surfactant, and 20 parts of water were weighed, placed into a reactor, and mixed under stirring at 100 rpm until completely dissolved, to give a homogeneous mixture solution.

(2) 0.15 part by weight of the above homogeneous mixture solution and 99.8 parts by weight of water were weighed, placed into a reactor, and mixed under stirring at 100 rpm until completely dissolved, to obtain a nonionic permeability-enhancing flooding system having an effective concentration of 0.11%, and a homogeneous and transparent appearance.

The following inspections and tests were carried out on the nonionic permeability-enhancing flooding system.

The average particle size of the above-mentioned nonionic permeability-enhancing flooding system was measured by dynamic light scattering (BI-200SM, Brookhaven) at 25° C. and a scattering angle of 90°. The data from the instrument did not converge, indicating a failure to form the desired nanoscale system. As compared with Example 1, this Comparative Example has changed the surfactant to di(octylphenol polyoxyethylene ether)-substituted diphenyl ether dicarboxylate as the nonionic gemini surfactant, but the desired nanoscale system is not formed, indicating that the desired nanoscale system cannot be obtained without addition of a solubilizer, if the alkyl chain in the nonionic gemini surfactant is changed.

Comparative Example 2

This Comparative Example provides an anionic permeability-enhancing flooding system and a preparation method thereof comprising main steps as follows.

(1) 1 parts by weight of calcium chloride, 15 parts by weight of cinene, 65 parts of tetralauryl-substituted diphenyl ether sulfonate as the gemini surfactant, and 19 parts of water were weighed, placed into a reactor, and mixed under stirring at 200 rpm until completely dissolved, to give a homogeneous mixture solution.

(2) 0.2 part by weight of the above homogeneous mixture solution and 95 parts by weight of water were weighed, placed into a reactor, and mixed under stirring at 200 rpm until completely dissolved, to obtain an anionic permeability-enhancing flooding material for an improved recovery, having an effective concentration of 0.17%, a homogeneous and transparent appearance, and stable for a long time.

The following inspections and tests were carried out on the anionic permeability-enhancing flooding system.

The average particle size of the above-mentioned anionic permeability-enhancing flooding system was measured by dynamic light scattering (BI-200SM, Brookhaven) at 25° C. and a scattering angle of 90°. The data from the instrument did not converge, indicating a failure to form the desired nanoscale system. As compared with Example 2, this Comparative Example has changed the surfactant to tetralauryl-substituted diphenyl ether sulfonate as the gemini surfactant, but the desired nanoscale system is not formed, indicating that the desired nanoscale system cannot be obtained without addition of a solubilizer, if the alkyl chain in the anionic gemini surfactant is changed.

Comparative Example 3

This Comparative Example provides a nonionic permeability-enhancing flooding system and a preparation method thereof comprising main steps as follows.

(1) 5 parts by weight of sodium chloride, 15 parts by weight of xylene, 60 parts of di(nonylphenol polyoxyethylene ether)-substituted diphenyl ether dicarboxylate as the nonionic gemini surfactant, and 20 parts of water were weighed, placed into a reactor, and mixed under stirring at 100 rpm until completely dissolved, to give a homogeneous mixture solution.

(2) 0.15 part by weight of the above homogeneous mixture solution and 99.8 parts by weight of water were weighed, placed into a reactor, and mixed under stirring at 100 rpm until completely dissolved, to obtain a nonionic permeability-enhancing flooding system having an effective concentration of 0.11%, a homogeneous and transparent appearance, and being stable for a long time.

The following inspections and tests were carried out on the nonionic permeability-enhancing flooding system.

The average particle size of the above-mentioned nonionic permeability-enhancing flooding system was measured by dynamic light scattering (BI-200SM, Brookhaven) at 25° C. and a scattering angle of 90°. The data from the instrument did not converge, indicating a failure to form the desired nanoscale system. As compared with Example 1, this Comparative Example has changed the oil-soluble substance to xylene, but the desired nanoscale system is not formed. It shows that the desired nanoscale system cannot be obtained without addition of the solubilizer, when the oil-soluble substance is changed. As seen from the above Comparative Examples 1-3, in the permeability-enhancing flooding system of the present invention, the three components are synergistically interacting with each other, and the desired nanoscale system cannot be obtained when any one is out of the defined scope in the present invention.

Obviously, the above-mentioned examples of the present invention are merely examples for clearly illustrating the present invention, and are not intended to limit the embodiments of the present invention. For those of ordinary skill in the art, other different forms of modifications or changes can be made on the basis of the above description. It is impossible to be exhaust all of the embodiments herein. Any obvious modifications or changes derived from the technical solutions of the present invention are still within the protection scope of the present invention.

The invention claimed is:

1. A permeability-enhancing flooding system for tight oil reservoirs, which is composed of a surfactant, an oil-soluble substance and water, and present in a state of oil-in-water droplet, and has an external phase that is an aqueous solution containing the surfactant, and an inner phase that is the oil-soluble substance;

wherein the surfactant comprises one of nonionic gemini surfactants and anionic gemini surfactants, or a combination of two or more thereof;

the nonionic gemini surfactant is di-substituted diphenyl ether dicarboxylate having a structural formula of:

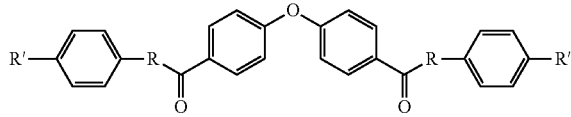

wherein R is a carboxyl group, an amino group, an ester group, an alkyl polyoxyethylene ether segment or an alkylphenol polyoxyethylene ether segment; R' is a $C_{9-12}$ alkyl group;

the anionic surfactant is tetraalkyl-substituted diphenyl ether sulfonate having a structural formula of;

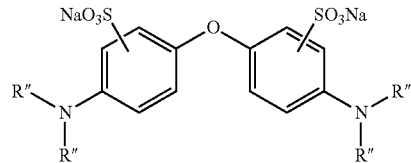

wherein R" is a $C_{14-16}$ alkyl group; and the oil-soluble substance is one of linear olefin and cinene, or a combination of two or more thereof.

2. The permeability-enhancing flooding system according to claim 1, wherein the oil-soluble substance is undecene or cinene.

3. The permeability-enhancing flooding system according to claim 1, wherein the total concentration of the surfactant and the oil-soluble substance in the permeability-enhancing flooding system is 0.05 wt. %-0.3 wt. %, wherein the mass percentage of the surfactants is 75%-85%, and the mass percentage of the oil-soluble substance is 15%-25% of the combined mass of the surfactants and the oil-soluble substance.

4. The permeability-enhancing flooding system according to claim 1, wherein the oil-in-water droplet has a particle size distribution of 3 nm-30 nm.

5. The permeability-enhancing flooding system according to claim 1, wherein the water is inorganic salt water, and the mass content of the inorganic salt is 20% or less, based on the total mass of the permeability-enhancing flooding system.

6. The permeability-enhancing flooding system according to claim 5, wherein the inorganic salt is sodium chloride or calcium chloride.

7. The permeability-enhancing flooding system according to claim 1, wherein R is —$(OCH_2CH_2)_{10}O$—.

8. A method for preparing the permeability-enhancing flooding system according to claim 1, comprising:
   mixing the surfactant and the oil-soluble substance uniformly to obtain a homogeneous mixture solution; or mixing the surfactant, the oil-soluble substance, and an aqueous solution containing an inorganic salt uniformly to obtain a homogeneous mixture solution; and
   diluting the homogeneous mixture solution with water or inorganic salt water to a working concentration to obtain the permeability-enhancing flooding system.

9. The method according to claim 8, wherein the mixing and diluting are both carried out by stirring at 10 rpm-400 rpm.

* * * * *